March 22, 1955 K. MELCHER 2,704,399
PIVOTAL COUPLING FOR A PAIR OF COOPERATING TOOL LEGS
Filed Jan. 12, 1954
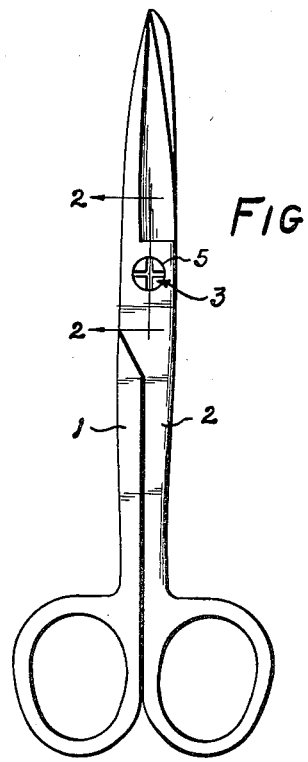
FIG-1
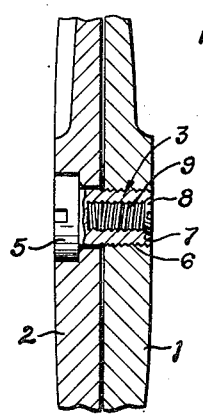
FIG-2
FIG-3
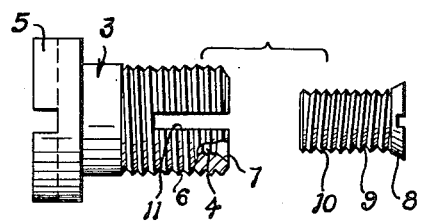
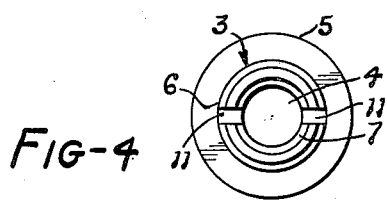
FIG-4
INVENTOR.
KARL MELCHER
BY Toulmin & Toulmin
ATTORNEYS

United States Patent Office 2,704,399
Patented Mar. 22, 1955

2,704,399

PIVOTAL COUPLING FOR A PAIR OF COOPERATING TOOL LEGS

Karl Melcher, Solingen-Merscheid, Germany

Application January 12, 1954, Serial No. 403,523

Claims priority, application Germany June 12, 1950

2 Claims. (Cl. 30—266)

This invention relates to pivotal couplings for the legs of shear and plier type surgical and mechanical instruments and the like.

This application is a continuation-in-part of my co-pending application, Serial No. 207,041, filed January 20, 1951, and now abandoned.

In the pivotal coupling of the legs of precision instruments, particularly surgical instruments, it is absolutely essential that the coupling be adjusted to a precise point and be absolutely secure against loosening. In general, this securing is obtained by riveting the coupling in place, or by providing a slightly oversized screw which will screw tightly into one of the legs while retaining the other thereon.

When the legs are riveted together it becomes virtually impossible to do a proper repair job on the instrument, and likewise makes adjustment thereof, as the instrument wears, very difficult. When an oversize screw is employed the possibility always exists that the coupling will lose its adjustment or that the screw will bind in the leg in which it is threaded, thus forming a defective coupling.

The present invention has, as its primary object, the provision of an improved coupling for precision instruments which avoids the foregoing difficulties.

This invention has as its particular object the provision of a threaded type pivotal coupling for the legs of instruments of the nature referred to which is precisely adjustable to any desired point and which can be locked securely in position.

A still further particular object of this invention is the provision of a threaded type pivotal coupling for the legs of instruments of the nature referred to, together with a threaded locking device therefor so arranged that the locking device can be actuated to lock the pivotal coupling in place without affecting the adjustment thereof.

The objects of this invention are attained, in brief, by providing a screw adapted for rotatably receiving one of the legs and for being threaded into the other thereof to retain the legs together. The end of the pivot screw opposite the head thereof is bored and threaded, and axially slotted for receiving a clamping screw which will spread the slotted end of the pivot screw into clamping relation with the leg in which it is threaded.

According to this invention, the threads on the pivot screw and the clamping screw are of opposite hand, thereby facilitating the setting of the clamp screw without affecting the adjustment of the pivot screw.

This invention will be more clearly understood upon reference to the following specification, taken in connection with the accompanying drawings, wherein:

Figure 1 is an elevational view of a surgical shears having the legs carried by a pivotal coupling according to my invention;

Figure 2 is a section indicated by line 2—2 of Figure 1 showing the pivotal coupling referred to;

Figure 3 is an enlarged view of the pivot screw and clamping screw, with the pivot screw partly broken away to show the tapered seat that is engaged by the head of the clamping screw; and Figure 4 is an end view of the pivot screw looking in from the right end.

Referring to the drawings somewhat more in detail, the instrument in Figure 1 comprises the legs 1 and 2 that are retained together by means of pivot screw 3 which, as will be seen in Figure 2, has its head seated in a counterbore in leg 2 and its shank threadedly engaging leg 1.

As will be seen in Figures 2, 3 and 4, pivot screw 3 is axially bored as at 4 from the end opposite the head 5 of the screw, and this bore is threaded with a thread which is of opposite hand to the threads 6 on the shank of the pivot screw. This bore 4 likewise has a tapered seat 7 adapted for being engaged by the tapered head 8 of clamp screw 9 that has threads 10 adapted for engaging the threads in the bore 4. The shank of screw 3 is also slotted at 11 so as to be spreadable when head 8 of clamp screw 9 presses on seat 7.

In assembling the instrument, screw 3 is adjusted to the proper position to retain legs 1 and 2 of the instrument together so that the legs are precisely located, and then clamp screw 9 is threaded into bore 4 until tapered head 8 of the clamp screw engages the taper 7 in the mouth of bore 4. At this time the pivot screw 3 can be locked tight in leg 1 by rotating screw 9 by a suitable instrument, such as a screwdriver, until it seats tightly against taper 7. Screw 3 at this time may be held in position by a tool such as a screwdriver, but it will be noted that since the threads on clamp 9 are of opposite hand to those on the shank of pivot screw 3, the tendency of screw 9 would be to rotate the pivot screw in a direction slightly to tighten the connection of the legs with each other rather than to loosen the connection. Thus it will be seen that the tightening of clamp screw 9, when arranged according to my invention with a thread thereon of opposite hand than the thread on the pivot screw, will not be accompanied by any undesired change in the setting of the pivotal connection between the legs of the instrument.

It will be understood that this invention is susceptible to modification in order to adapt it to different usages and conditions, and, accordingly, it is desired to comprehend such modifications within this invention as may fall within the scope of the appended claims.

I claim:

1. In a pivot means for pivotally connecting two tool legs, a pivot member having a head on one end and a screw-threaded shank extending therefrom adapted for being screwed into a threaded bore of one of said legs and fastened thereto, said shank being provided with an axial threaded bore extending therein from the end opposite said head, said shank being axially slotted from the end opposite said head, and a lock screw adapted for being threaded into said axial threaded bore of the shank for spreading the said shank for locking it into said one leg, said lock screw being provided with a beveled head, and the mouth of said axial threaded bore in said shank being provided with a bevel thereabout adapted for cooperating with the bevel on the head of said lock screw for causing spreading of said shank, the cooperating threads of said lock screw and said pivot member shank bore being of opposite hand from the cooperating threads of said pivot member shank and said leg bore.

2. A surgical instrument comprising first and second leg members pivotally connected together intermediate their ends, said first leg member having an open ended threaded bore extending therethrough at the pivot section, a pivot screw having a head and an integral threaded shank of smaller diameter than said head and threaded into the bore of said first leg member, said second leg member having an opening therethrough at its pivot section and registering with said threaded bore for accommodating the shank of said screw, said second leg having a counterbore in said opening providing a recessed portion to receive the head of said pivot screw, said shank being slotted axially thereof dividing said shank into two diametrically opposed expansible sections, said shank having an internally threaded bore section, a lock screw threadedly engaging said bore section of the shank and expanding the shank portions to thereby lock said pivot screw in threaded engagement with said first leg member, the opposite ends of said pivot screw being flush with the respective outer surfaces of said legs, and the outer end of said lock screw being flush with the adjacent end of said pivot screw, said lock screw comprising a tapered head, the bored section of the shank of said pivot screw comprising a beveled mouth portion on which the head of the lock screw seats, the cooperating threads of said lock screw and said pivot member shank bore being of opposite hand from the cooperating threads of said pivot member shank and said leg bore.

References Cited in the file of this patent

UNITED STATES PATENTS

| | | |
|---|---|---|
| 107,704 | Moorcroft | Sept. 27, 1870 |
| 322,657 | Tolman | July 21, 1885 |
| 767,403 | Glover et al. | Aug. 16, 1904 |
| 891,061 | Hansen | June 16, 1908 |
| 1,795,532 | Wilck | Mar. 10, 1931 |
| 2,478,595 | Richter | Aug. 9, 1949 |